United States Patent
Blake et al.

(10) Patent No.: US 9,611,633 B2
(45) Date of Patent: *Apr. 4, 2017

(54) PLUMBING FIXTURE WITH FLUSH VALVE ACTUATOR AND METHODS FOR CALIBRATING SAME

(71) Applicant: Kohler Co., Kohler, WI (US)

(72) Inventors: Joseph S. Blake, Sheboygan, WI (US); Joseph L. Stauber, Sheboygan Falls, WI (US)

(73) Assignee: KOHLER CO., Kohler, WI (US)

( * ) Notice: Subject to any disclaimer, the term of this patent is extended or adjusted under 35 U.S.C. 154(b) by 596 days.

This patent is subject to a terminal disclaimer.

(21) Appl. No.: 14/036,870

(22) Filed: Sep. 25, 2013

(65) Prior Publication Data

US 2014/0020168 A1 Jan. 23, 2014

Related U.S. Application Data

(63) Continuation of application No. 12/620,021, filed on Nov. 17, 2009, now Pat. No. 8,555,428.

(51) Int. Cl.
| | |
|---|---|
| *E03D 11/10* | (2006.01) |
| *E03D 5/012* | (2006.01) |
| *E03D 5/10* | (2006.01) |
| *F16K 1/22* | (2006.01) |
| *F16K 3/22* | (2006.01) |
| *F16K 37/00* | (2006.01) |
| *F16K 31/04* | (2006.01) |

(52) U.S. Cl.
CPC .............. *E03D 11/10* (2013.01); *E03D 5/012* (2013.01); *E03D 5/10* (2013.01); *F16K 1/221* (2013.01); *F16K 3/22* (2013.01); *F16K 31/042* (2013.01); *F16K 37/0083* (2013.01)

(58) Field of Classification Search
CPC ............ E03D 11/10; E03D 5/012; E03D 5/10
USPC .......................................... 4/434, 438, 441
See application file for complete search history.

(56) References Cited

U.S. PATENT DOCUMENTS

| | | | |
|---|---|---|---|
| 2,302,695 A | 11/1942 | Kalix | |
| 3,387,748 A | 6/1968 | Brenchley | |
| 3,599,248 A | 8/1971 | Fulton et al. | |

(Continued)

FOREIGN PATENT DOCUMENTS

| | | |
|---|---|---|
| CA | 1059106 | 7/1979 |
| CA | 2240076 | 2/2003 |

(Continued)

OTHER PUBLICATIONS

Four pages of an ISR from the corresponding PCT/US2010/056300, mailed Feb. 18, 2011.

(Continued)

Primary Examiner — Huyen Le
(74) Attorney, Agent, or Firm — Foley & Lardner LLP

(57) ABSTRACT

Plumbing fixtures with a valve actuator for automatically controlling pivoting of a flush valve, and methods of calibrating movement of the flush valve, are disclosed. The motor of the valve actuator may be positioned between the bowl of the fixture and a leg of a trapway to provide compact assembly. A belt drive laterally extending along the trapway links the motor to the flush valve. The method of calibrating includes establishing stop points which are at positions of less resistance than hard stop positions.

20 Claims, 9 Drawing Sheets

(56) References Cited

U.S. PATENT DOCUMENTS

| | | |
|---|---|---|
| 3,908,204 A | 9/1975 | Hopkins |
| 4,611,617 A | 9/1986 | Hewitt |
| 4,840,349 A | 6/1989 | Peter et al. |
| 4,876,751 A | 10/1989 | Van Meter |
| 4,918,764 A | 4/1990 | Haselswerdt et al. |
| 5,099,867 A | 3/1992 | Emery |
| 5,155,870 A | 10/1992 | Tsutsui et al. |
| 5,187,818 A | 2/1993 | Barrett, Sr. et al. |
| 6,044,857 A | 4/2000 | Stege |
| 6,059,148 A | 5/2000 | Keller et al. |
| 6,186,471 B1 | 2/2001 | Genga et al. |
| 6,370,709 B1 * | 4/2002 | Stradinger .............. E03F 1/006 137/588 |
| 6,530,557 B1 | 3/2003 | Guzorek |
| 6,704,947 B2 | 3/2004 | Stradinger et al. |
| 7,069,604 B2 | 7/2006 | Tomita et al. |
| 7,284,286 B1 | 10/2007 | Kopplin et al. |
| 8,230,533 B2 | 7/2012 | Jorsch et al. |
| 8,555,428 B2 * | 10/2013 | Blake ...................... E03D 5/012 4/434 |
| 2003/0121092 A1 * | 7/2003 | Sigler .................. B61D 35/005 4/434 |
| 2005/0155143 A1 * | 7/2005 | Chu ........................ E03D 11/10 4/434 |
| 2008/0047053 A1 | 2/2008 | Grech et al. |
| 2008/0072372 A1 * | 3/2008 | Jorsch ..................... E03D 11/10 4/434 |
| 2008/0276362 A1 * | 11/2008 | O'Malley ............... E03D 5/012 4/420 |

FOREIGN PATENT DOCUMENTS

| | | |
|---|---|---|
| DE | 9798 | 5/1880 |
| DE | 217221 | 12/1909 |
| EP | 1645692 | 4/2006 |
| GB | 01278 | 0/1910 |
| JP | 2010-510409 | 4/2010 |
| WO | WO02093058 | 11/2002 |
| WO | WO2008-039307 | 4/2008 |
| WO | WO2011-062830 | 5/2011 |

OTHER PUBLICATIONS

First Office Action in Chinese App. No. 201080060801.7 dated Aug. 16, 2013.
Korean Notice of Decision of Rejection regarding Application No. 10-2012-7014691 dated Jun. 24, 2014.
Japanese Official Action regarding Application No. 2012-538963 mail date of Oct. 15, 2013.

* cited by examiner

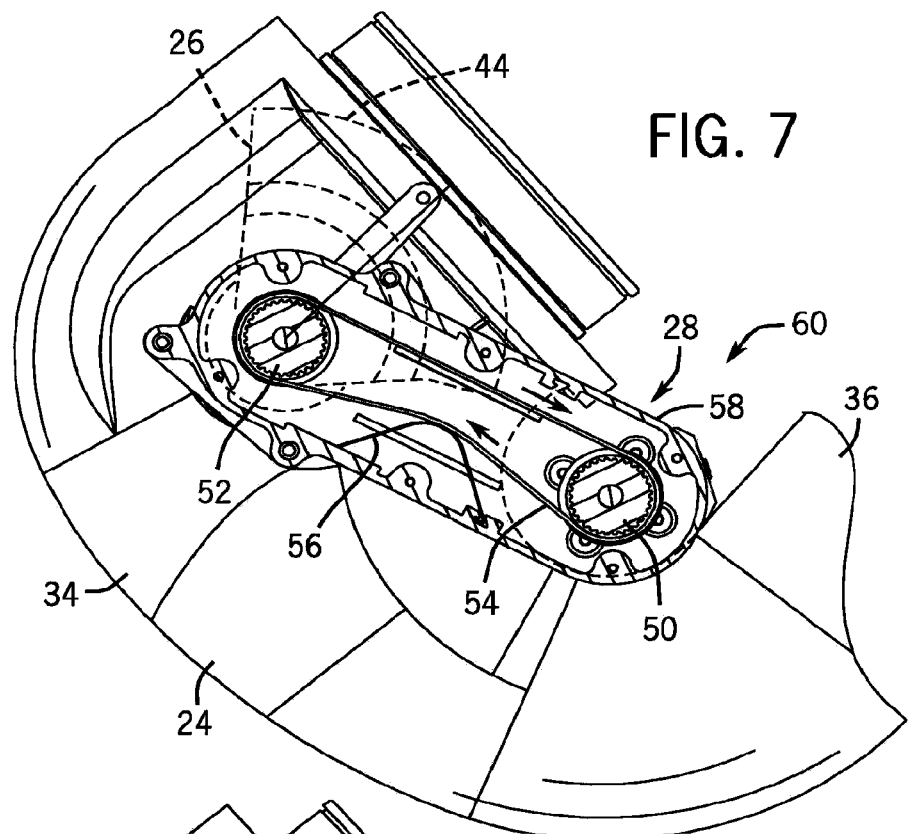
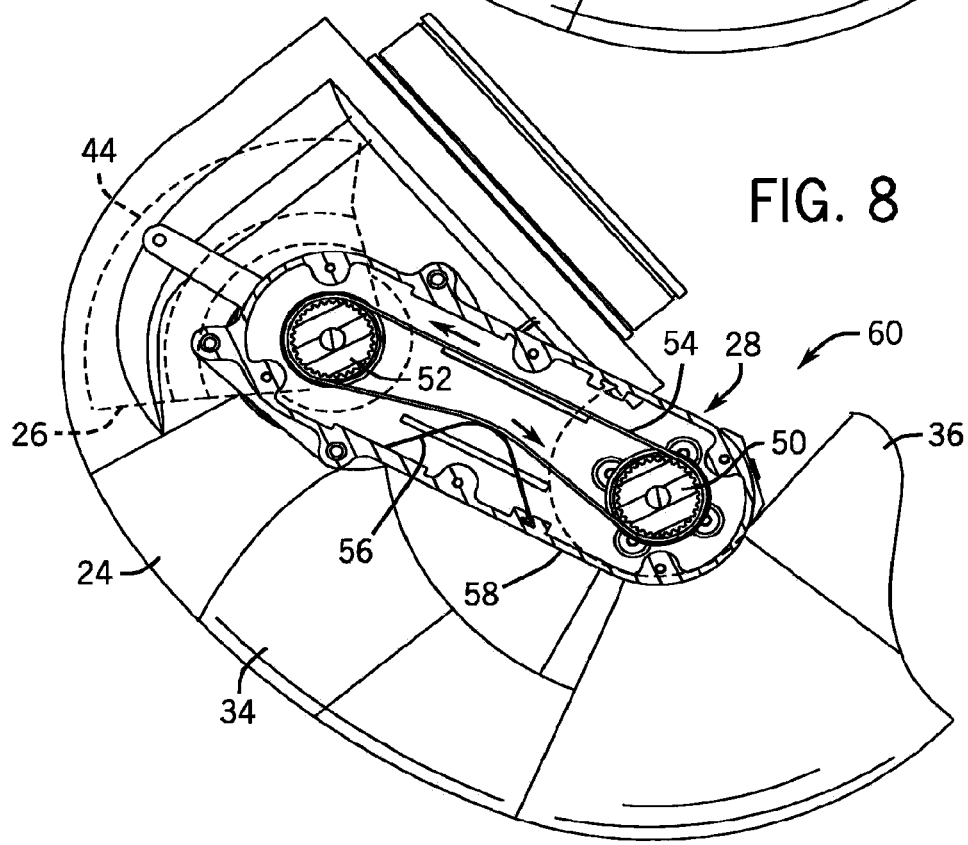

PLUMBING FIXTURE WITH FLUSH VALVE ACTUATOR AND METHODS FOR CALIBRATING SAME

CROSS-REFERENCE TO RELATED PATENT APPLICATIONS

The present application is a continuation of U.S. application Ser. No. 12/620,021, filed Nov. 17, 2009, which is incorporated herein by reference in its entirety.

BACKGROUND

The present invention relates to plumbing fixtures such as toilets and bidets which have a trapway extending from a lower outlet of their main bowl. In particular, it relates to automated outlet flush valves used therewith, and methods of positioning and calibrating actuators therefor.

Toilets are known which have a pivotable outlet flush valve between the bowl's lower outlet and a trapway extending therefrom towards the sewer system. See e.g. U.S. patent application publication 2008/0072372. As described in that publication, the pivot valve can be linked to an automated control system so as to control toilet flushing via that means.

However, using this type of system currently has a number of drawbacks. For one thing, the motor or other actuator system for the pivot valve is typically positioned so as to project laterally out from the trapway in a way that disrupts aesthetics, or uses up desirable lateral space. For another, motor systems attached thereto may present surfaces that can undesirably snag other items (e.g. during cleaning).

Moreover, when such pivotable flush valves are repetitively driven between hard stop open and closed positioned by motors, the life of the seal and motor assembly can be compromised absent use of more expensive materials. This can create maintenance issues, and/or undesirably increase the cost of the product to the consumer.

Hence, there is a need for improvements to address the above issues.

SUMMARY

One aspect of the present invention provides a plumbing fixture having a bowl with a lower opening. The lower opening is in selective communication with a trapway. The trapway has an upwardly extending leg linked to a downwardly extending leg, in switchback fashion. There is a space outside the trapway between the bowl and upwardly extending leg.

A flush valve is positioned between the lower opening and a portion of the trapway for controlling flow from the bowl through the trapway. The plumbing fixture further includes a valve actuator having a motor that is positioned at least in part in said space. There is also a linkage connected to the motor to be driven thereby. The valve actuator is also connected to the flush valve so that during a flushing cycle it can controllably move the flush valve between a first position in which the flush valve prevents fluid removal from the bowl via the trapway and a second, open position where fluid in the bowl is permitted to evacuate from the bowl through the trapway.

In preferred aspects of the present invention:
(a) the linkage may be a belt drive;
(b) the linkage may be at least in part located on a lateral side of the trapway; and/or
(c) the linkage may pivot the flush valve.

To control pivoting of the flush valve, a controller is placed in electrical communication with the motor. The controller defines a limited range of pivoting of the flush valve between a seal position and an open position. The controller establishes this limited range at least in part by identifying a high resistance seal position and then setting an operational seal position at a lower resistance seal position adjacent to the high resistance seal position. The controller also preferably establishes this limited range in part by identifying a high resistance open position and then setting an operational open position at a lower resistance open position adjacent to the high resistance open position.

According to another aspect of the present invention there is provided a method of setting up a plumbing fixture of the type described above. The method includes establishing a limited range of pivoting of the flush valve at least in part by identifying a high resistance sealing position and then setting an operational sealing position at a lower resistance sealing position adjacent to the high resistance sealing point. The method may further include establishing said limited range in part by also identifying a high resistance open position and then setting an operational open position at a lower resistance position adjacent to the high resistance open position.

To do this the motor may be run to pivot the flush valve in a first direction until the flush valve encounters a first obstacle (e.g. the valve seat), thereby defining a first calibration position. The motor may then be reversed to pivot the flush valve in a second direction until the flush valve encounters a second obstacle (e.g. a full open stop surface), thereby defining a second calibration position.

The amount of motor operation required to pivot the flush valve between said first and second calibration positions is determined from that movement. An operational sealing position is then defined between the calibration positions, but still at a position where the flush valve firmly contacts the valve seat (albeit with somewhat less force). For example, the system can count the number of motor pulses required to pivot the flush valve between the first and second calibration positions and use that number to help define the sealing position. For example, if 390 pulses were needed to move from the hard seal to the full open position, the system might define the operational seal as 388 back towards the hard seal from the full open. It might then define the less full open operational open position as 386 back from the operational seal position.

Hence, this patent provides more compact assemblies for plumbing fixtures having automated flush valves. By placing the motor of the valve actuator in the space between the bowl and a leg of the trapway, and developing a linkage which essentially parallels a lateral aspect of the fixture, the design is more aesthetically pleasing, it presents less risk of undesirably snagging items, and it uses up less space.

Further, by employing the methods of setting up the actuator/flush valve, maintenance issues are reduced and the use of higher cost materials is not required.

The foregoing and still other advantages of the present invention will appear from the following description. In that description reference is made to the accompanying drawings which form a part hereof and in which there is shown by way of illustration preferred embodiments of the invention. These embodiments do not represent the full scope of the invention. Rather, the claims should be looked to in order to judge the full scope of the invention.

BRIEF DESCRIPTION OF THE DRAWINGS

FIG. 7 is an enlarged partial cross-sectional view of a part of the FIG. 4 structure, showing how the parts would appear with the flush valve in the operational seal position;

FIG. 8 is a view similar to FIG. 7, but showing how the parts would appear when the flush valve is in the operational open position;

DETAILED DESCRIPTION

Figure 1:
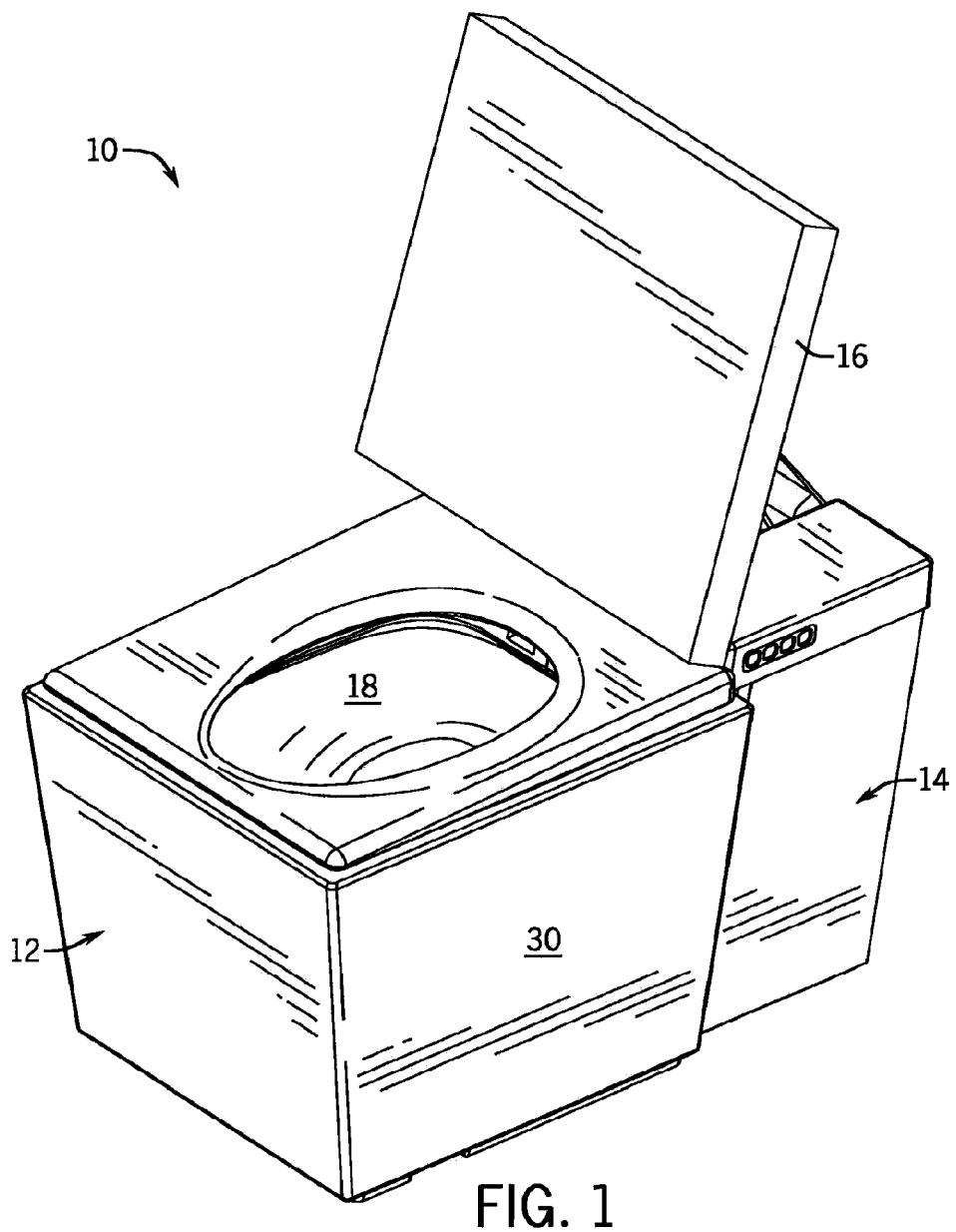
FIG. 1 is a perspective view of a preferred toilet of the present invention.
Figure 2:
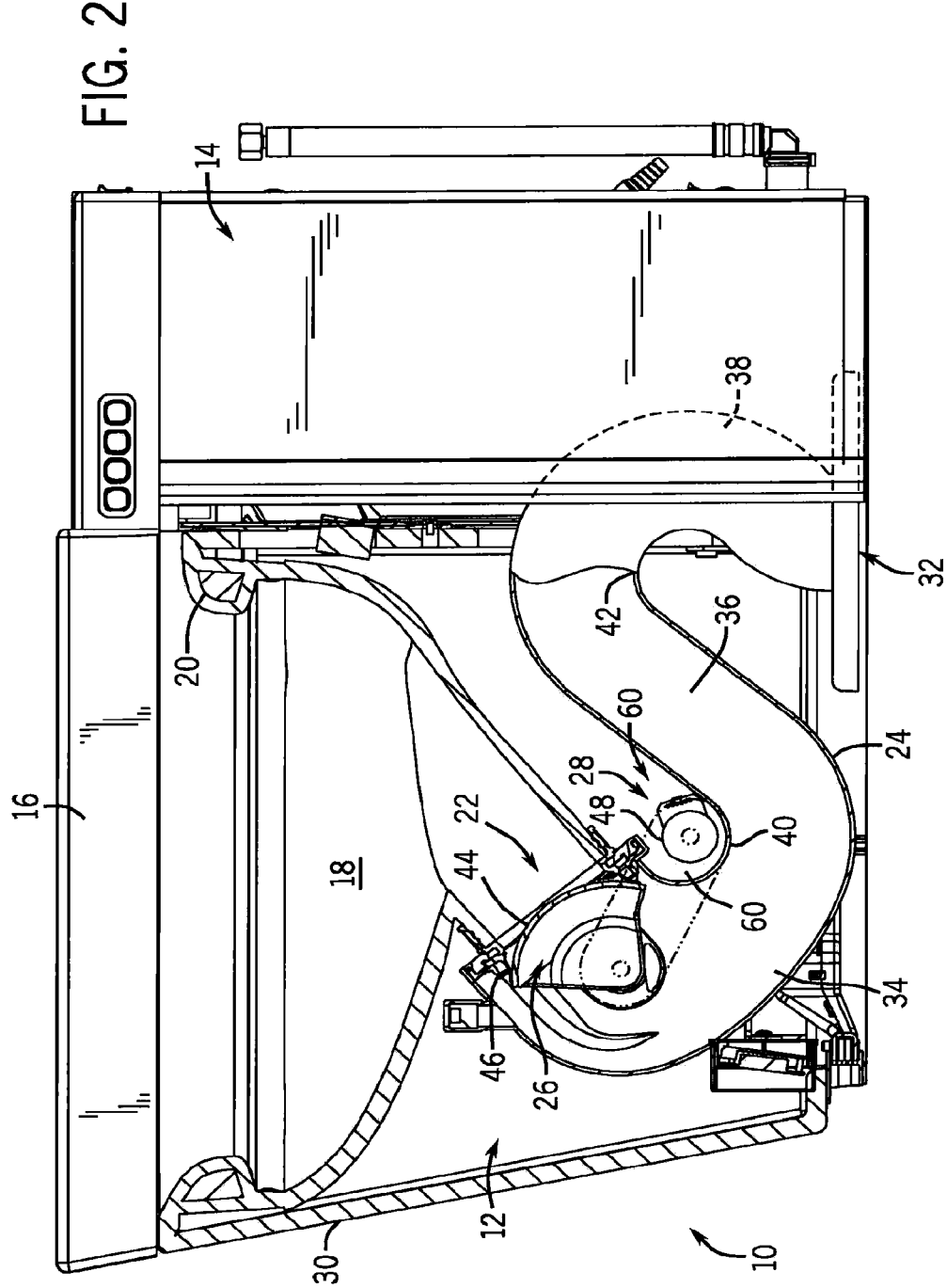
FIG. 2 is partial cross-sectional view of the toilet of FIG. 1.
Figure 3:
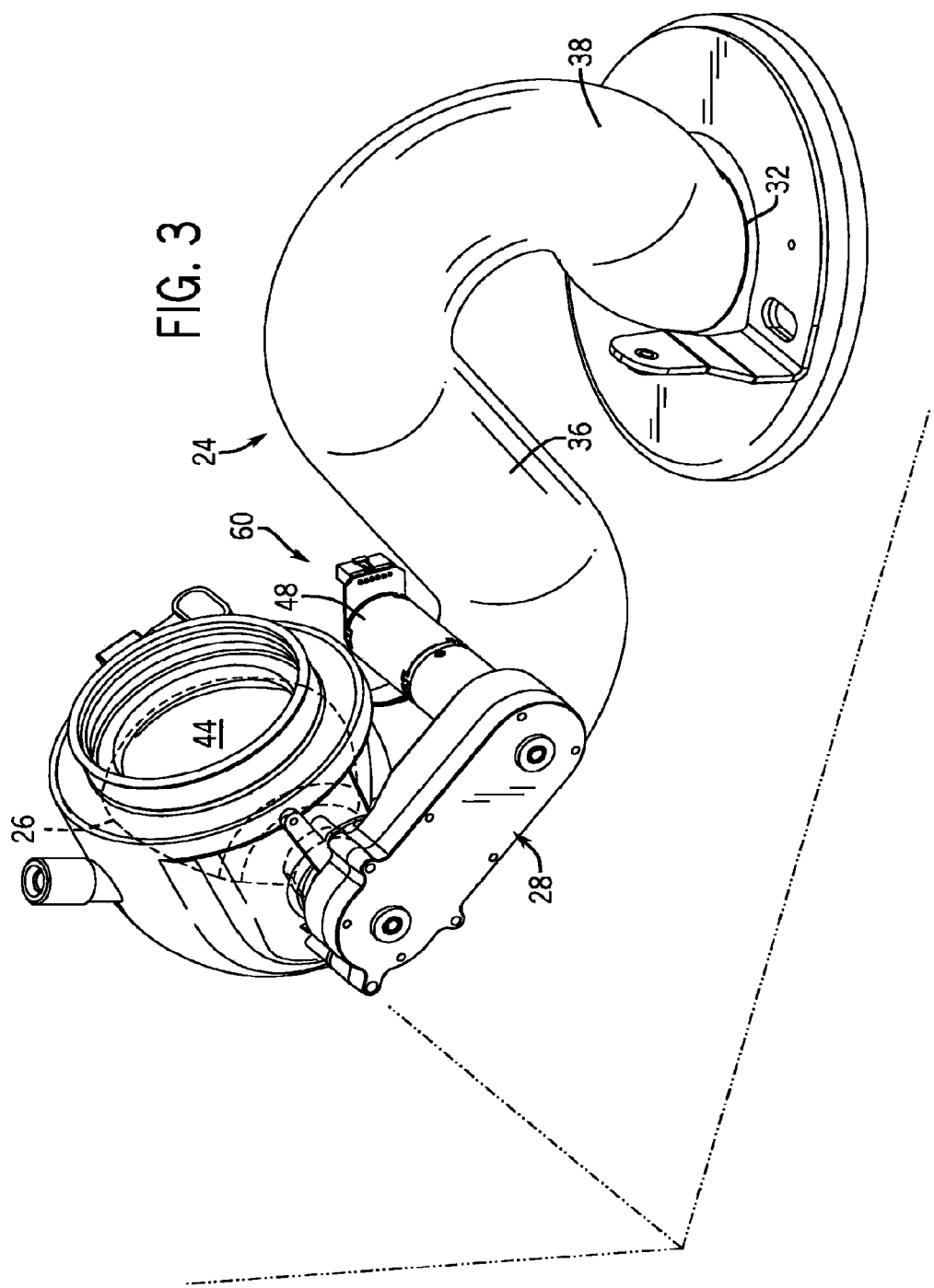
FIG. 3 is a rear, top, side perspective view of the trapway and the attached valve actuator of FIG. 1.
Figure 4:
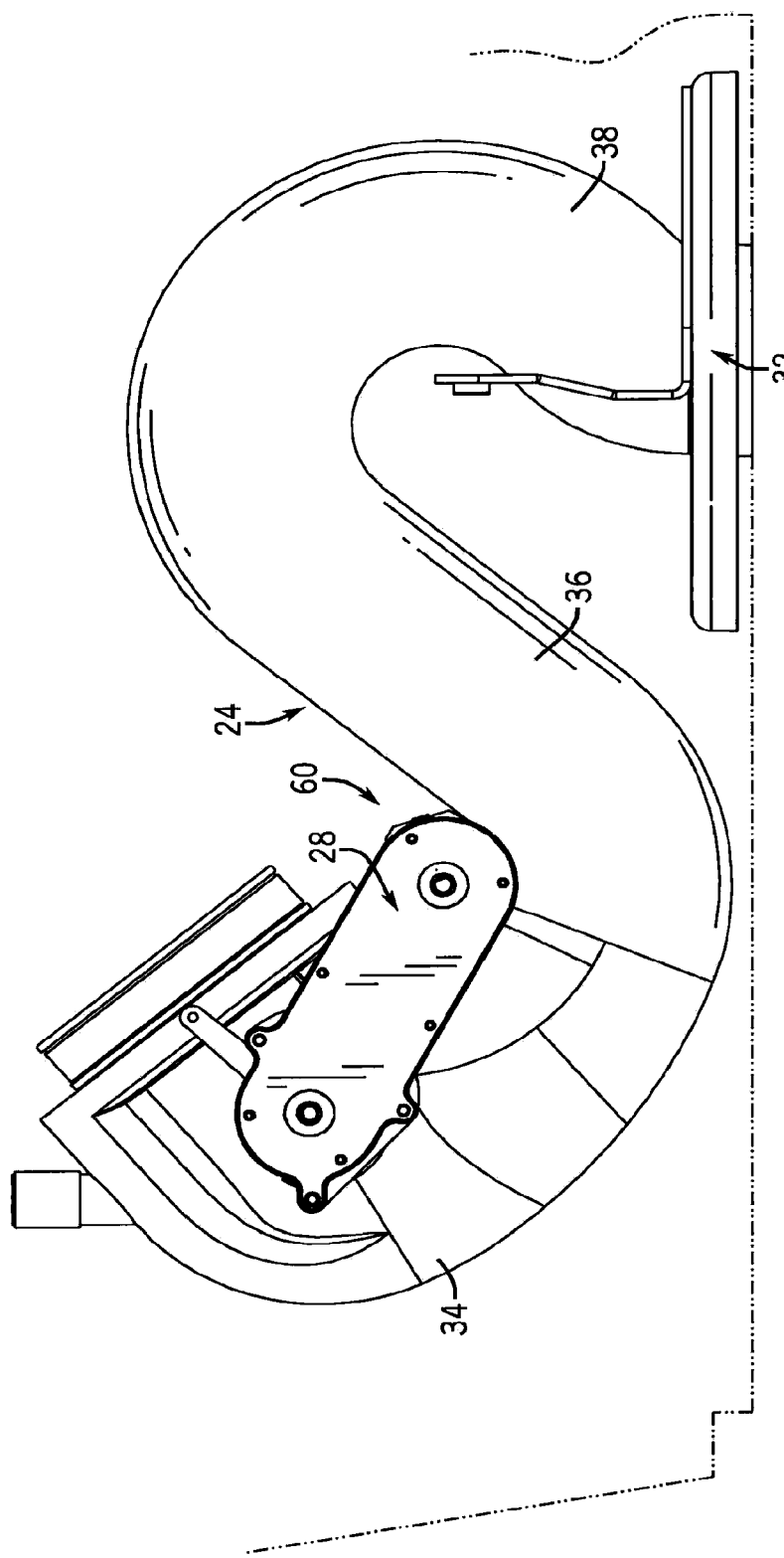
FIG. 4 is a side elevational view of the FIG. 3 components.
Figure 5:
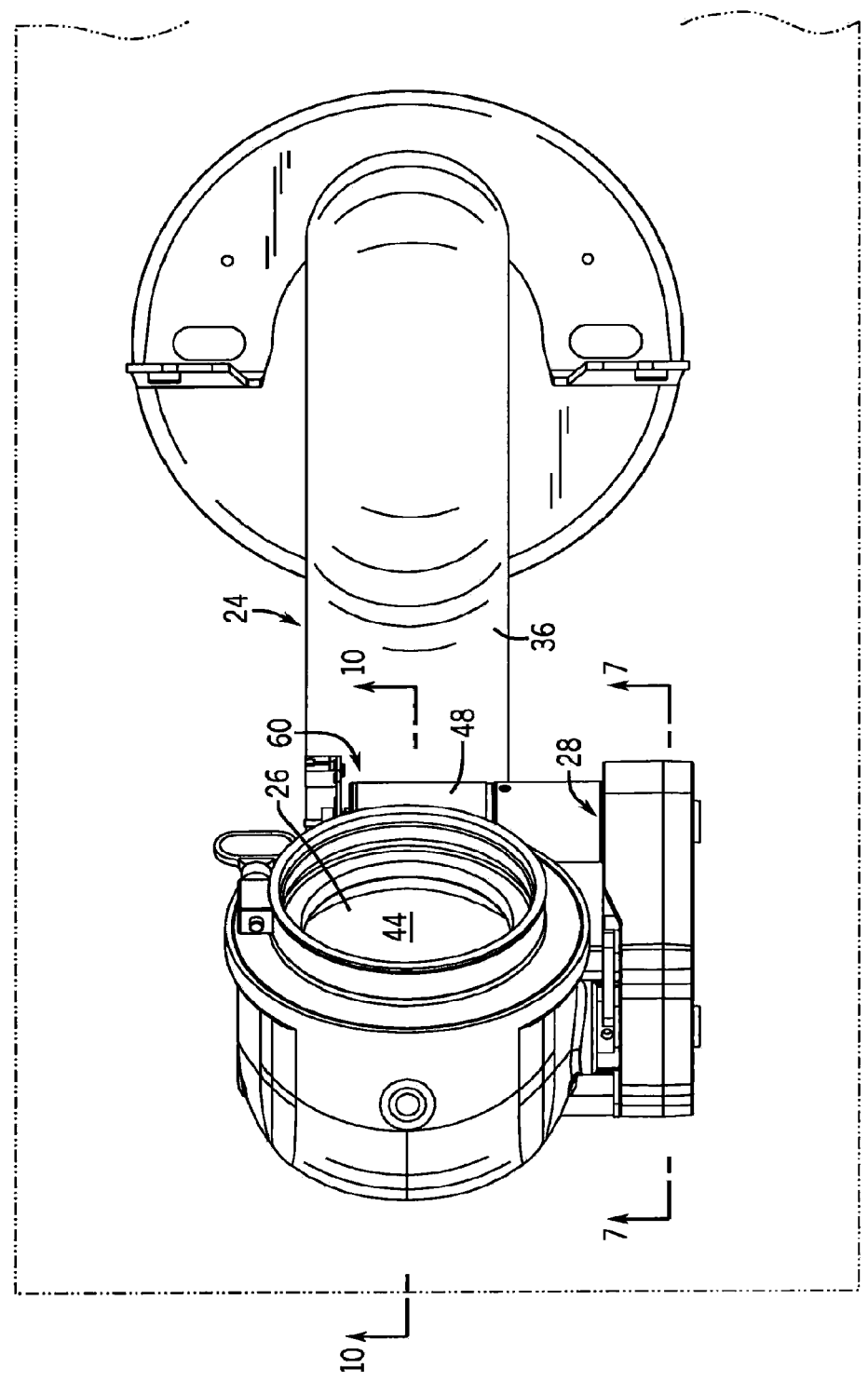
FIG. 5 is a top plan view of the FIG. 3 components.

Referring first to FIGS. 1 and 2, a toilet 10 is shown that has a front section 12, a backpack portion 14, and a movable lid 16. The front section 12 includes a bowl 18 extending from an upper rim 20 down to a lower opening 22, which in turn connects to a trapway 24.

An outlet flush valve 26, which will be described in more detail below, is positioned between the lower opening 22 of the bowl 18 and the trapway 24 to place the two in selective communication with each other. There is a valve actuator 28 which is linked to the flush valve 26 and controlled by a controller 27 (see FIG. 6).

In the most aesthetic forms of the invention there is an outer shroud 30 that envelopes the bowl 18, the trapway 24, and the valve actuator 28. However, this is not required. A large number of other operational components including, but not limited to, a water tank, a battery backup, air circulators, and various electronic components, are housed in the backpack portion 14.

With additional reference to FIGS. 3-6, the shape of the trapway 24 is serpentine/switchback. As the trapway 24 extends down from the lower opening 22 and towards a sewer connector 32, the trapway 24 includes an entry 34 which in a conventional fashion then curves back up behind the bowl 18 to communicate with an upwardly extending leg 36.

Then, the upwardly extending leg 36 then curves downwardly in switchback fashion to communicate with a downwardly extending leg 38. This creates the usual weir 42 between the upwardly extending leg 36 and the downwardly extending leg 38. When the toilet 10 is between flush cycles water will collect in the trap above point 40 of FIG. 2 so as to prevent sewer gases from returning back to the bathroom.

It should particularly be appreciated that as shown in FIG. 2 there is a space 60 outside the trap and bowl formed between the bowl and up leg 36. This is where various portions of the actuating system are now positioned, as will be discussed below.

Figure 6:
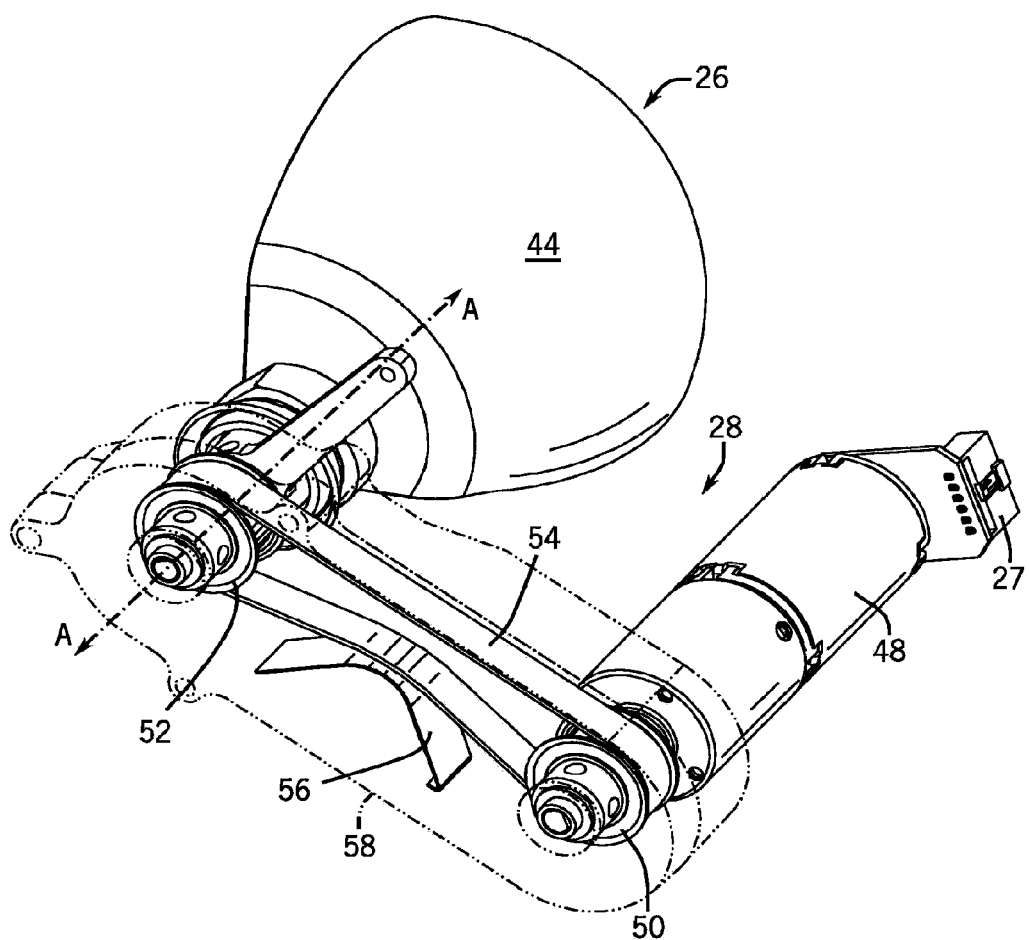
FIG. 6 is an enlarged perspective view of a portion of the FIG. 3 parts, with a belt drive cover shown removed.

The preferred flush valve 26 has a generally arcuate sealing surface 44 which is pivotable about an axis of rotation A-A in FIG. 6. As best understood from FIG. 10, the generally arcuate sealing surface 44, depending on the pivotal position of the flush valve 26, can be placed in sealing contact with the valve seat 46 to form a seal between the bowl 18 and the trapway 24, or alternatively moved sufficiently away from that lip to permit the bowl to evacuate.

The preferred valve actuator 28 includes a motor 48 that is in electrical communication with the controller 27, a first rotatable member 50 attached to the motor 48, a second rotatable member 52 attached to the flush valve 26, and a drive belt 54 extending between the first and second rotatable members 50/52. A tensioning element 56 can be located along the drive belt 54 so as to provide improved tensioning force to keep the drive belt 54 in tension. A guard cover 58 is placed around the drive belt 54 and the rotatable members 50 and 52.

While the most preferred drive is a belt drive system, it should be appreciated that other drive systems and/or linkages may also be provided for the valve actuator 28. For example, a chain and sprocket type drive system might be used.

The motor 48 is largely positioned in the space 60. This presents an extremely compact assembly. However, by doing this, one still needs to translate the motion provided by the motor to movement of the flush valve. This is achieved by the use of the belt drive, which essentially parallels the front-to-back axis of the toilet, albeit on a lateral side of the trap.

Referring next to FIGS. 7 and 8, the operation of the flush valve 26 is illustrated. In these figures, the flush valve 26 is illustrated in phantom lines.

In FIG. 7 the flush valve 26 is positioned in an operational seal position in which the arcuate sealing surface 44 of the flush valve 26 contacts the lip of the valve seat 46 to form an effective seal between the bowl 18 and the trapway 24. The flush valve 26 will be located in this position between flush cycles so as to retain a pool of water in the bowl 18. If the flush valve 26 is not already in this position, then the flush valve 26 can be moved or pivoted to this position by running the motor 48 such that the drive belt 54 is driven in a clockwise manner, relative to the view of the valve actuator 28 is illustrated in FIG. 7 and as indicated by motion arrows on FIG. 7.

In FIG. 8 the flush valve 26 is shown as positioned in the open position in which the arcuate sealing surface 44 of the flush valve 26 has been pivoted to break the seal between the arcuate sealing surface 44 and the lip of the valve seat 46. The flush valve 26 is typically moved to this position during a flush cycle such that, when the valve is open, the bowl 18 and the trapway 24 are placed in fluid communication with one another. When open, fluid and waste in the bowl 18 will be evacuated through the flush valve 26, into the trapway 24, out of the sewer connector 32, and into an attached sewer line. To move from a sealed position to an opened position, the drive belt 54 may be driven in a counter-clockwise direction relative to the view of the valve actuator 28 shown in FIG. 8 and as indicated by the motion arrows on FIG. 8.

Figure 9:
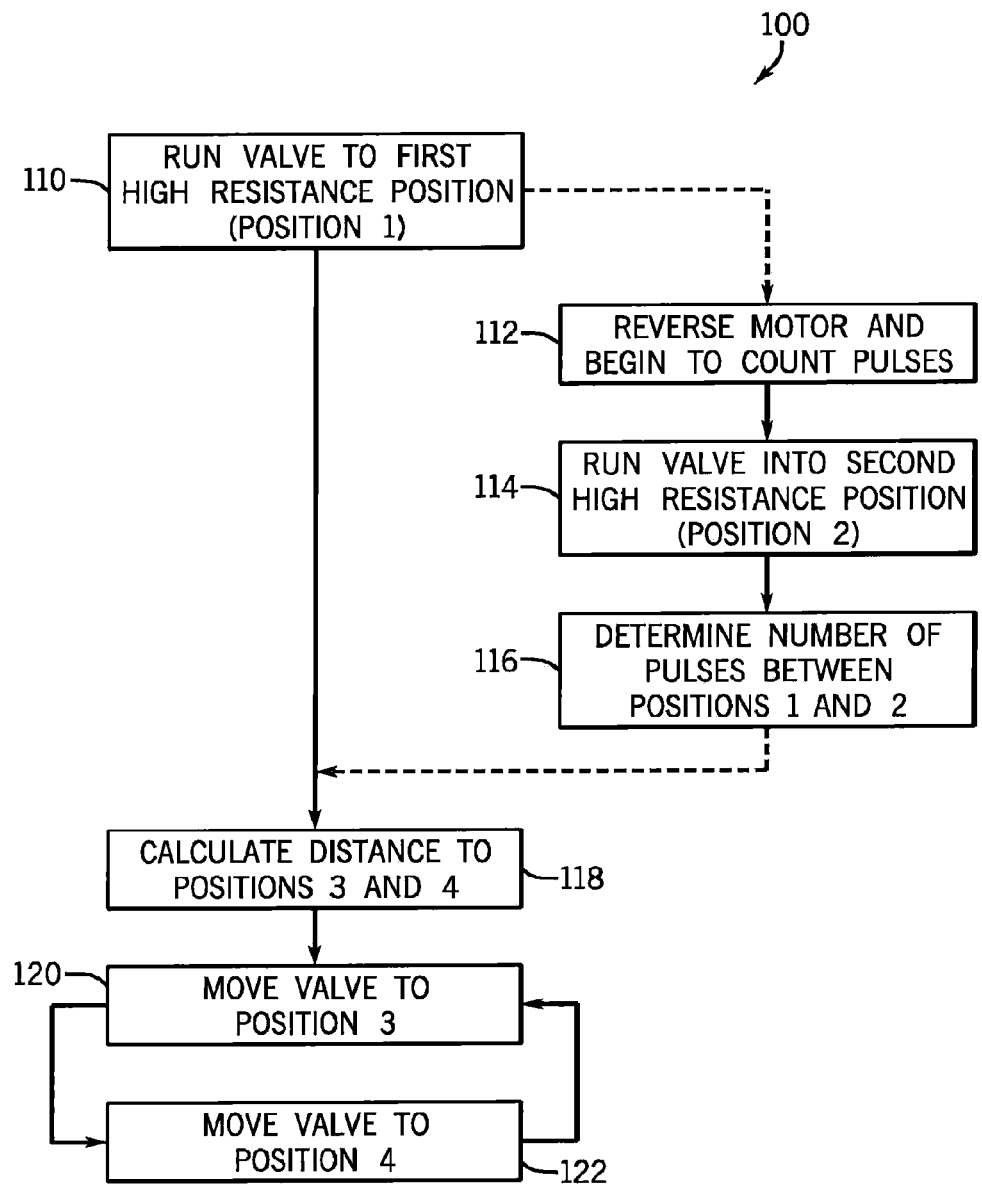
FIG. 9 is a flow chart of a preferred method of calibrating the actuator/flush valve.
Figure 10:
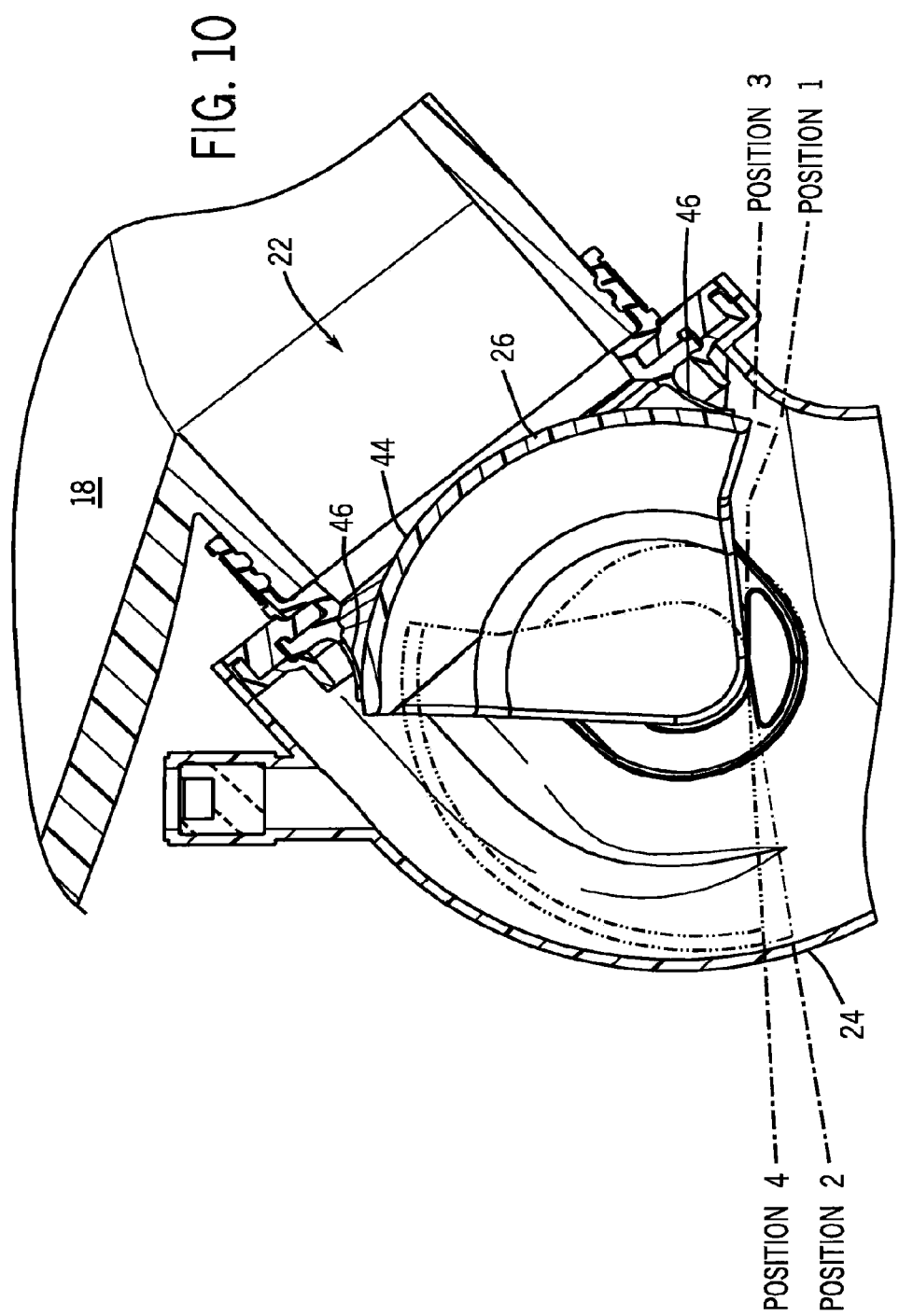
FIG. 10 is a cross-sectional view focusing on the flush valve positioning at various stages of the calibration method.

Now with reference to FIGS. 9 and 10, methods 100 of setting up/calibrating the flush valve 26 are schematically illustrated. A calibration sequence may be run at the factory, or the system may be set up so that periodically it can be rechecked after installation. For example, a sensor could be provided that determines whether the system is leaking water into the trapway between flushes. When that is sensed, a calibration cycle can be run to reset the seal position.

However, the major purpose of the calibration system is to set the operational seal and operational open positions slightly away from the full hard stop positions, to reduce wear and thus maintenance problems. According to the methods 100, at least one, and preferably two, hard stop or high resistance positions are determined, and then at least one, and preferably two, operational positions are determined based thereon.

To determine the first hard stop or high resistance position (e.g. the valve seat), the motor 48 is run in a first direction until the flush valve 26 hits the valve seat with high resistance at position 1 according to step 110. At this point, a first position of reference has been determined which corresponds to one extreme of the pivotal range of the flush valve 26.

Then, the other extreme of the pivotal range of the flush valve may be determined. The motor 48 may be run in the reverse direction from the first direction according to step 112 until the flush valve 26 runs into a second high resistance position at position 2, corresponding to the full open, according to step 114.

Motor pulses are counted over this distance. For example, during the reversal of the motor 48 according to step 112, the motor 48 may be "pulsed" to incrementally run the flush valve 26 step-wise over the arcuate path of the flush valve 26. These pulses may be counted to determine the number of pulses between positions 1 and 2 and to evaluate the equivalent distance therebetween according to step 116.

From this value, a position 3 may be set which is effective for sealing, but not quite as pivoted as for position 1. This corresponds to an operational sealing position. One may also then set an operational open position 4 which is almost, but not quite as pivoted, as for position 2, according to step 118.

The operational sealing position is a position that is adjacent the high resistance sealing point at position 1, but is slightly offset such that it is at a lower resistance. Likewise, the operational open position is a position that is adjacent the high resistance open position at position 2, but at which again is at a lower resistance. During subsequent actuation of the flush valve 26, the valve is actuated between positions 3 and 4, thereby avoiding slamming against the stops.

If the motor 48 is using a pulse count to determine the pivotal distance and/or the positions 3 and 4, then the calculation step 118 may operate according to the following example. As the number of pulses between positions 1 and 2 will be known after step 116, the positions 3 and 4 which correspond to locations inwardly angularly offset from the high resistance positions of 1 and 2 may be determined according to step 118 using simple arithmetic.

For example, the number of pulses from position 2 (the second hard stop) back to position 3 (which may be a pulse away from the first hard stop at position 1) may be the counted number of pulses minus one pulse. The number of pulses to then go from position 3 (offset from position 1) to position 4 (offset from position 2) may be the counted number of pulses from position 1 to position 2 minus two pulses.

It should be appreciated that while counting pulses is one way of estimating/evaluating the amount of the pivotal range between two high resistance points and two operational points, that other ways of determining the spatial position of the flush valve 26 may be used such as sensors or non-incremental evaluation means.

Thus, plumbing fixtures having compact and aesthetically pleasing valve actuating systems are disclosed. Also disclosed are methods of calibrating movement of flush valves pivoted by such systems to reduce maintenance issues.

Also, by reducing the footprint of the actuation mechanism, such toilets can be used in many environments where there previously was not enough space in the bathroom to do so. Alternatively, saving space through the techniques of the present invention may provide extra space for the incorporation of other features with the fixture.

While a specific embodiment of the present invention has been shown, various modifications falling within the breadth and scope of the invention will be apparent to one skilled in the art. For example, similar principles could be applied to bidets. Thus, the invention should not be considered limited to just the embodiments of the drawings. Rather, the claims should be looked to in order to understand the full scope of the invention.

INDUSTRIAL APPLICABILITY

Disclosed are plumbing fixtures having automated bowl outlet flush valves, where the actuator therefor is compactly positioned and linked. Also disclosed are techniques for reducing maintenance problems with flush valves of this type.

What is claimed is:
1. A toilet comprising:
a bowl having a lower opening;
a trapway configured for selective fluid communication with the lower opening, the trapway and the bowl defining a space therebetween;
a flush valve positioned between the lower opening and a portion of the trapway and configured to control flow from the bowl through the trapway; and
a valve actuator positioned at least in part in the space, the valve actuator including a motor and a belt extending between the motor and the flush valve to move the flush valve between a first closed position wherein fluid is prevented from flowing from the bowl to the trapway, and a second open position wherein fluid can flow from the bowl to the trapway.

2. The toilet of claim 1, wherein the motor is positioned at least partially within the space.

3. The toilet of claim 2, wherein the valve actuator comprises a drive mechanism mechanically coupling the motor and the flush valve, wherein the drive mechanism includes the belt, a first rotatable member configured to be driven by the motor, and a second rotatable member configured to be driven by the first rotatable member through the belt and to drive the flush valve between the first closed position and the second open position.

4. The toilet of claim 3, wherein the drive mechanism includes a controller configured to control the motor.

5. The toilet of claim 3, wherein the drive mechanism extends laterally along a lateral side of the trapway.

6. A toilet comprising:
a bowl having a lower opening;
a trapway configured for selective fluid communication with the lower opening, the trapway and the bowl defining a space therebetween;
a flush valve positioned between the lower opening and a portion of the trapway and configured to control flow from the bowl through the trapway; and
a valve actuator positioned at least in part in the space, the valve actuator configured to move the flush valve between a first closed position wherein fluid is prevented from flowing from the bowl to the trapway, and a second open position wherein fluid can flow from the bowl to the trapway;
wherein the trapway includes an upper extending leg and a lower extending leg forming a switchback configuration for the trapway, the space being defined between the upward extending leg and the bowl.

7. The toilet of claim 6, further comprising a controller in electrical communication with the valve actuator to control pivoting of the flush valve.

8. A toilet comprising:
a bowl having a lower opening;
a trapway configured for selective fluid communication with the lower opening, the trapway and the bowl defining a space therebetween;
a flush valve positioned between the lower opening and a portion of the trapway and configured to control flow from the bowl through the trapway;
a valve actuator positioned at least in part in the space, the valve actuator configured to move the flush valve between a first closed position wherein fluid is prevented from flowing from the bowl to the trapway, and a second open position wherein fluid can flow from the bowl to the trapway;
a controller in electrical communication with the valve actuator to control pivoting of the flush valve, wherein the controller is configured to determine a limited range of pivoting of the flush valve between a seal position and an open position based at least in part by identifying a high resistance seal position and then setting an operational seal position at a lower resistance seal position adjacent thereto.

9. The plumbing fixture of claim 8, wherein the controller is configured to establish the limited range at least in part by identifying a high resistance open position and then setting an operational open position at a lower resistance open position adjacent thereto.

10. A plumbing fixture comprising:
a bowl;
a flush valve in fluid communication with the bowl;
a trapway in fluid communication with the flush valve;
an actuator provided at least in part in a space defined between the bowl, an entry of the trapway and an up leg of the trapway, the actuator coupled to the flush valve via a drive mechanism extending laterally along the trapway, the actuator configured to control operation of the flush valve to enable selective fluid communication between the bowl and the trapway via the flush valve.

11. The plumbing fixture of claim 10, wherein the actuator includes a motor provided in the space between the bowl and the trapway.

12. The plumbing fixture of claim 11, wherein the actuator includes a drive linkage such that operation of the motor causes pivoting of the flush valve.

13. The plumbing fixture of claim 11, further comprising a controller in electronic communication with the motor and configured to control operation of the motor, wherein the controller is configured to determine an operational range of pivoting of the flush valve that is less than hard stop positions.

14. A plumbing fixture comprising:
a bowl;
a flush valve in fluid communication with the bowl;
a trapway in fluid communication with the flush valve;
an actuator provided at least in part in a space defined between the bowl and the trapway, the actuator coupled to the flush valve via a drive mechanism extending laterally along the trapway, the actuator configured to control operation of the flush valve to enable selective fluid communication between the bowl and the trapway via the flush valve; and
a controller in electronic communication with the motor and configured to control operation of the motor, wherein the controller is configured to determine an operational range of pivoting by identifying a calibration range of pivoting for the flush valve and selecting the operational range of pivoting such that the operational range of pivoting is less than and within the calibration range of pivoting.

15. A method of configuring a toilet comprising:
actuating a pivotable flush valve for a toilet;
identifying a high resistance sealing position for the flush valve, the high resistance sealing position defining a closed position for the flush valve;
setting an operational range of pivoting for the flush valve, the operational range of pivoting for the flush valve defined in part by an operational sealing position selected to be at a lower sealing position adjacent the high resistance sealing position.

16. The method of claim 15, further comprising identifying a high resistance open position, wherein the operational range of pivoting for the flush valve is further defined in part by an operational open position selected to be at a lower open position adjacent the high resistance open position.

17. The method of claim 16, wherein setting the operational range of pivoting for the flush valve comprises identifying a calibration range of pivoting between the high resistance sealed position and the high resistance open position and selecting the operational sealing position and the operation open position such that the operational range of pivoting is within and less than the calibration range of pivoting.

18. The method of claim 15, wherein the pivotable flush valve is actuated by a motor.

19. The method of claim 18, wherein the operational range of pivoting or the flush valve is determined by counting motor pulses of the motor.

20. The method of claim 18, wherein the toilet comprises:
a bowl with a lower opening;
a trapway in selective communication with the lower opening, the trapway having an upwardly extending leg linked to a downwardly extending leg in switchback fashion;
wherein the motor is positioned within a space defined between the bowl and the trapway.

\* \* \* \* \*